United States Patent
Hung et al.

(10) Patent No.: US 12,551,637 B2
(45) Date of Patent: Feb. 17, 2026

(54) INTEGRATED DEVICE FOR INHALATION MEDICATION AND PEAK FLOW MEASUREMENT AND METHOD OF USING THE SAME

(71) Applicant: NATIONAL APPLIED RESEARCH LABORATORIES, Hsinchu (TW)

(72) Inventors: Shu-Hui Hung, Hsinchu (TW); Yu-Lu Hsiao, Hsinchu (TW); Chih-Sheng Yu, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 524 days.

(21) Appl. No.: 18/111,859

(22) Filed: Feb. 20, 2023

(65) Prior Publication Data

US 2024/0181180 A1  Jun. 6, 2024

(30) Foreign Application Priority Data

Dec. 6, 2022 (TW) .................................. 111146707

(51) Int. Cl.
*A61M 15/00* (2006.01)
*A61M 11/00* (2006.01)

(52) U.S. Cl.
CPC .......... *A61M 15/009* (2013.01); *A61M 11/00* (2013.01); *A61M 11/008* (2014.02); *A61M 2205/3584* (2013.01); *A61M 2205/52* (2013.01)

(58) Field of Classification Search
CPC .............. A61M 15/008; A61M 15/009; A61M 2205/3334
See application file for complete search history.

(56) References Cited

U.S. PATENT DOCUMENTS

| | | | | |
|---|---|---|---|---|
| 3,732,864 A | * | 5/1973 | Thompson | A61M 15/009 128/200.23 |
| 5,284,133 A | * | 2/1994 | Burns | A61M 15/0066 128/203.14 |
| 5,839,430 A | * | 11/1998 | Cama | A61B 5/411 128/200.14 |
| 6,082,355 A | * | 7/2000 | Howlett | A61M 15/0095 128/200.22 |
| 2003/0178020 A1 | * | 9/2003 | Scarrott | A61M 15/0068 128/200.23 |
| 2007/0175469 A1 | * | 8/2007 | Rohrschneider | B05B 11/108 128/200.14 |

* cited by examiner

*Primary Examiner* — Timothy A Stanis
(74) *Attorney, Agent, or Firm* — James W. Huffman; Huffman Law Group, PC

(57) ABSTRACT

The present disclosure is directed to an integrated device for inhalation medication and peak flow measurement and method of using the same. The integrated device integrates a respiratory flow rate measurement unit and a wireless communication module into the inhaler device, so that the inhaler device has both a medication function and a respiratory flow rate measurement function, and the integrated device is capable of transmitting the measured respiratory flow data to an electronic device by wireless transmission, so as to construct a personalized health assessment model, which can be used as a reference for medical personnel to make treatment decisions.

7 Claims, 4 Drawing Sheets

INTEGRATED DEVICE FOR INHALATION MEDICATION AND PEAK FLOW MEASUREMENT AND METHOD OF USING THE SAME

BACKGROUND OF THE INVENTION

1. Field of the Present Disclosure

The present disclosure relates to an integrated device for inhalation medication and peak flow measurement and a method of using the same, more particularly, to an integrated device for inhalation medication and peak flow measurement with wireless transmission function and a method of using the same.

2. Background

An inhaler is a commonly used appliance for patients with chronic respiratory diseases. It is used to press the inhaler to make the medicine in the medicine bottle enter the patient's lungs through inhalation to achieve a therapeutic effect. Inhalators are commonly used to treat patients with chronic obstructive pulmonary disease (COPD), stridor, or asthma.

Many patients often neglect the importance of correct medication and medication time, which may lead to reduced drug efficacy, and even more likely to sudden death, especially for patients with chronic respiratory diseases, who need to take drugs for a long time to control the disease. However, the patient may not take the medicine within the specified time, or the way of taking the medicine is incorrect, which may lead to the deterioration of the disease.

At present, to detect whether the drugs inhaled by patients using inhalers are effective, doctors generally observe or ask patients directly, or calculate whether they are effective drugs by using the number of times of use of inhalers and the number of remaining drugs. However, using the number of times use inhalers and the number of remaining drugs can only negatively calculate the number of effective drugs, and it is impossible to confirm whether patients take drugs according to the time of use, the dosage of drugs, and instructions for effective drugs. While the patient may not have any symptoms that aggravate the condition in the outpatient service, and the doctor is unable to provide accurate and effective treatment.

In addition, patients with chronic respiratory diseases can retrieve medication behavior data such as dosage, time, and place of medication by scientific and technological means when taking home medication, for example, the inhalation device and its device and method for recording medication information requested by Patent No. I310905 of the Republic of China, or the medication recording device and its method requested by Patent No. I572377 of the Republic of China. However, this method cannot immediately master the patient's chronic respiratory disease.

Moreover, although the daily measurement of respiratory tract values can monitor health status, patients often ignore the importance of daily measurement on time. On the one hand, it may be cumbersome to record the best value after measuring the patient's breath many times. On the other hand, it may be that the patient forgets to carry a spirometer and pen and paper records because of busy work, which leads to the patient giving up the need to monitor breathing just because the respiratory tract recovers to an acceptable state, resulting in missing the first time point to prevent chronic respiratory diseases.

To sum up, it is necessary to develop an integrated device that can simultaneously record the respiratory peak flow rate and monitor the medication behavior when inhaled.

SUMMARY OF THE INVENTION

In view of the problem of the prior art mentioned above, the purpose of the present disclosure is to overcome the shortcomings of the prior art mentioned above. After years of unremitting research and development and experiments, the inventor finally developed an integrated device for inhalation medication and peak flow measurement to effectively solve the problem of the prior art.

The present disclosure is directed to the integrated device for inhalation medication and peak flow measurement, which comprises a medicine bottle, an L-shaped inhaler body, a drug release port, a medicine bottle bracket, an L-shaped drug delivery channel, a respiratory flow rate measurement unit, a power supply unit, an integration module, a plurality of air holes, and a medicine bottle bracket knob.

The medicine bottle is disposed on the L-shaped inhaler body, and the drug release port is located at the other side of the medicine bottle disposed on the L-shaped inhaler body. The medicine bottle bracket is disposed below an inner portion of the L-shaped inhaler body, and the L-shaped drug delivery channel is disposed at an inner side of the medicine bottle bracket, while the respiratory flow rate measuring unit is disposed at an outer side of the medicine bottle bracket. One end of the L-shaped drug delivery channel is connected to an opening of the medicine bottle, and the other end is facing the drug release port. The respiratory flow rate measuring unit is disposed on the opposite side of the L-shaped drug delivery channel towards an end of the drug release port.

The power supply unit is disposed at a corner and/or both sides of the L-shaped inhaler body. The air holes are disposed at a lower corner of the L-shaped inhaler body. The integration module is disposed below the L-shaped inhaler body and between the drug release port and the medicine bottle bracket. The integration module comprises a power switch, an operation module, and a wireless communication module. The power supply unit is respectively electrically connected to the respiratory flow rate measurement unit, the power switch, the operation module, and the wireless communication module, and the medicine bottle bracket knob is integrally disposed below the medicine bottle bracket.

When patients with chronic respiratory diseases need to use the integrated device for inhalation medication and peak flow measurement for inhalation drug administration, the method is as follows: after containing the drug release port, press the medicine bottle to release the drug along the opening of the medicine bottle to the L-shaped drug delivery channel. After the patient inhales the drug, the drug administration is completed once. The external air is sucked into the L-shaped inhaler body through the air holes to avoid the closed state formed inside the L-shaped inhaler body, which affects the patient's inhalation of drugs. At this time, the operation module immediately records and analyzes the medication action to analyze and record whether the medication action is effective.

If it is necessary to measure the peak flow rate of respiration, the method is as follows: before or after the drug administration, pull the medicine bottle bracket knob, rotate the medicine bottle bracket 180 degrees, and make the respiratory flow rate measurement unit face the drug release port. Then, the patient takes a deep breath and exhales through the drug release port, while the air holes can exhale correspondingly to discharge the air inside the L-shaped inhaler body, avoiding the formation of high pressure or closed state inside the L-shaped inhaler body, which affects the peak flow rate of the patient's breath measurement. The flow rate, temperature, and/or flow rate of the airflow when the patient exhales is measured by the respiratory flow rate measurement unit, and the operation module records and analyzes the flow rate, temperature, and/or flow rate of the airflow in real-time, so as to know the peak flow rate of the current respiration and related information.

The operation module comprises a storage unit and a computing unit. The storage unit is used to store the patient's medication time, medication times, medication dosage, and other medication data, or to store the patient's respiratory data such as the flow rate, temperature, and/or flow rate of the airflow when the patient exhales. The computing unit is used for computing the drug administration data or the respiratory data to obtain the corresponding drug administration information or respiratory information, and then stores the information to the storage unit.

The wireless communication module can transmit the drug administration information and respiratory information stored in the storage unit to an external electronic device, so that patients or doctors can view them and understand the current medication demand or medication effect.

To sum up, the integrated device for inhalation medication and peak flow measurement of the present disclosure is capable of enabling the inhaler device to have both medication function and respiratory flow rate measurement function by integrating the respiratory flow rate measurement unit and the wireless communication module into the inhaler device and transmitting the measured respiratory flow rate data and medication data to external electronic devices through the wireless communication module, which can be easily viewed by patients or doctors. Furthermore, the personalized health assessment model can be constructed based on the medication data and respiratory data as a reference for medical personnel to make treatment decisions. Next, the technical features of the present disclosure, namely, the requested integrated device for inhalation medication and peak flow measurement, will be described in specific embodiments.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

In order to make it easier for the reviewing committee to understand the technical features, contents, and advantages of the present disclosure and the effects it can achieve, the present disclosure is hereby combined with the accompanying drawings, and is described in detail in the form of examples. The main purpose of the diagrams used therein is only to illustrate and assist the specification, and may not be the true proportion and accurate configuration after the implementation of the present disclosure, Therefore, the proportion and configuration relationship of the attached schema should not be interpreted, and the scope of rights of the present disclosure in actual implementation should not be limited.

Unless otherwise defined, all terms used herein (including technical and scientific terms) have meanings commonly understood by those who are generally knowledgeable in the technical field to which the present disclosure belongs. It will be further understood that terms such as those defined in commonly used dictionaries should be interpreted as having meanings consistent with their meanings in the context of related technologies and the present disclosure, and will not be interpreted as idealized or overly formal unless explicitly defined in this context.

Figure 1:
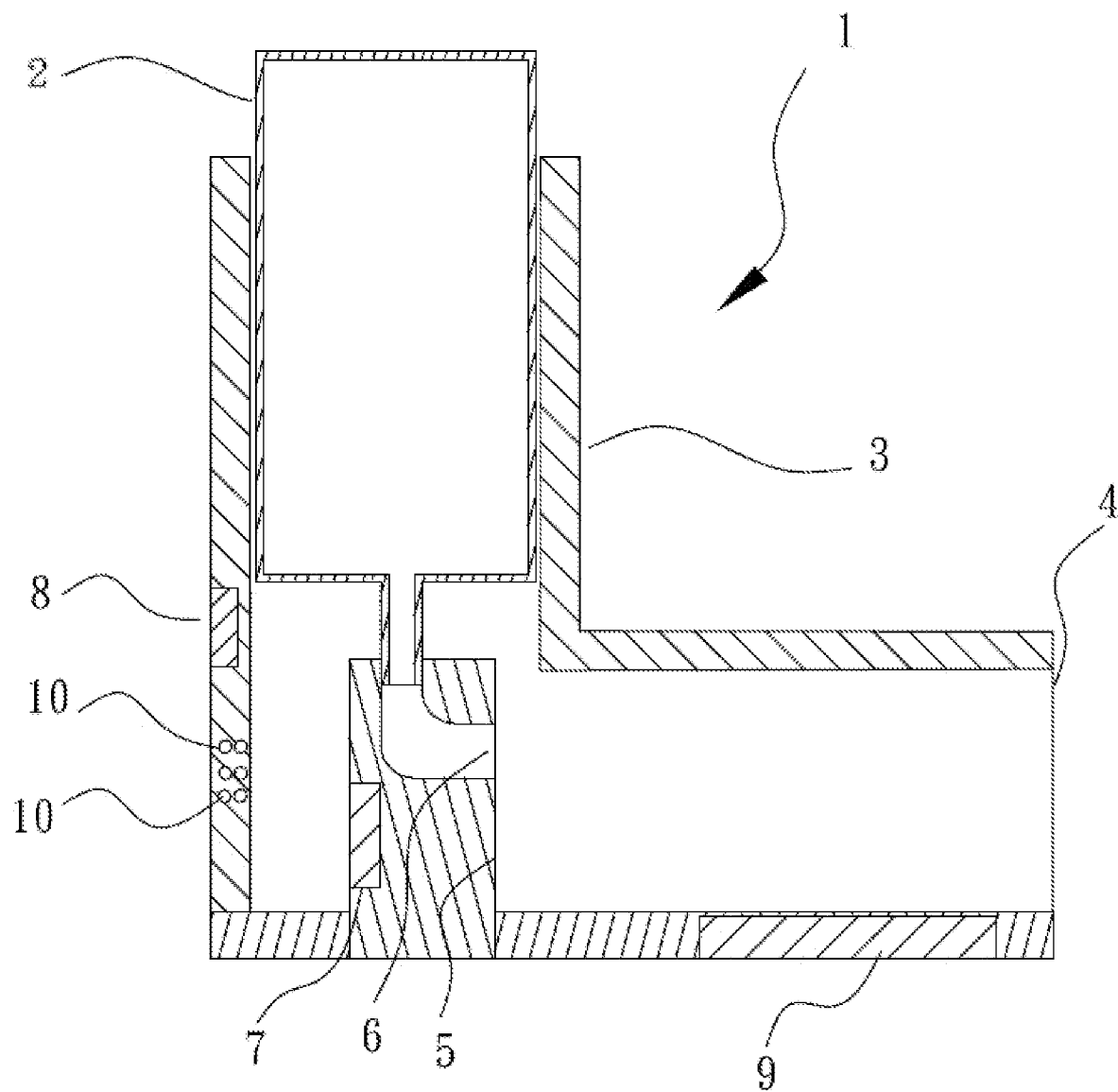
FIG. 1 is a side and cross-sectional view and a schematic diagram of a power supply unit being disposed at a corner of an L-shaped inhaler body of an integrated device for inhalation medication and peak flow measurement according to one embodiment of the present disclosure.
Figure 2:
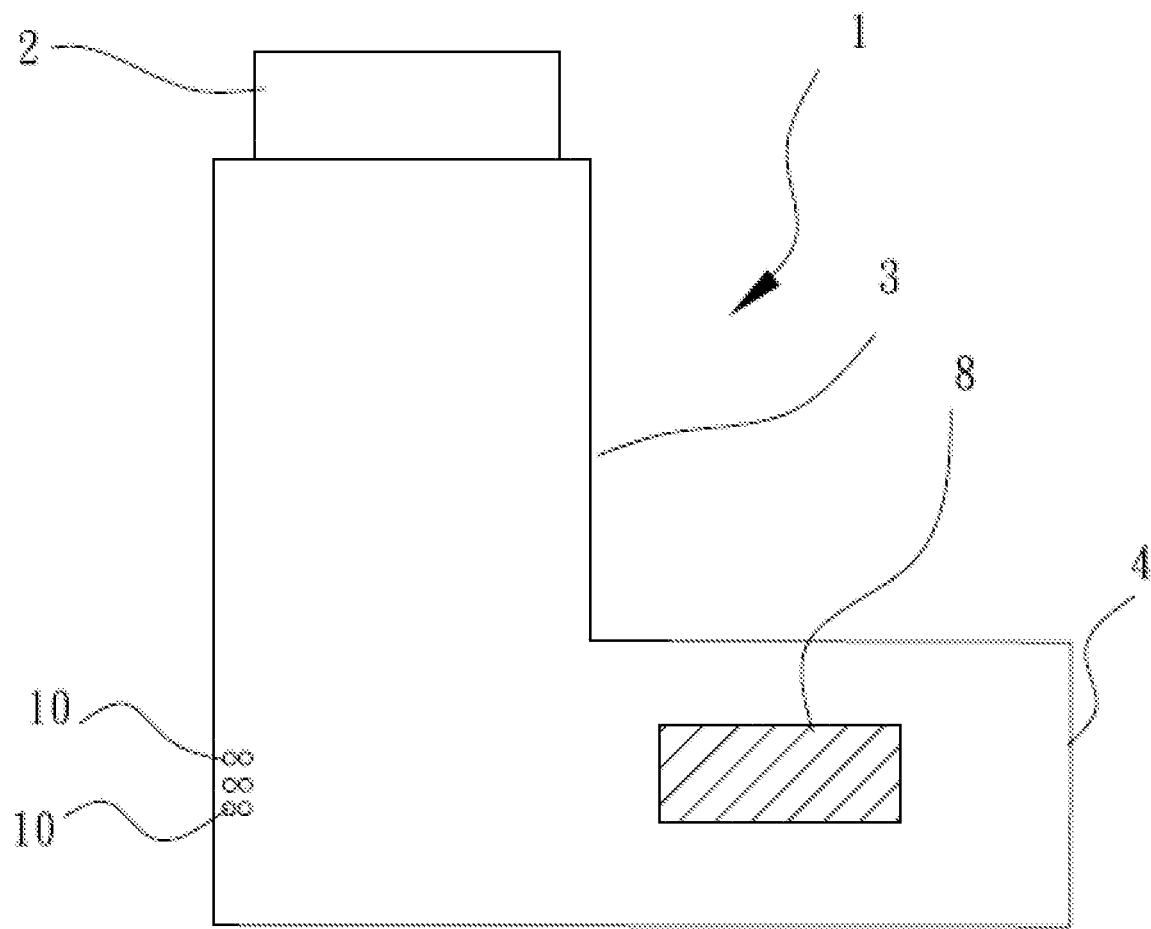
FIG. 2 is a schematic diagram of the power supply unit being disposed on both sides of the L-shaped inhaler body in the integrated device for inhalation medication and peak flow measurement according to one embodiment of the present disclosure.
Figure 3:
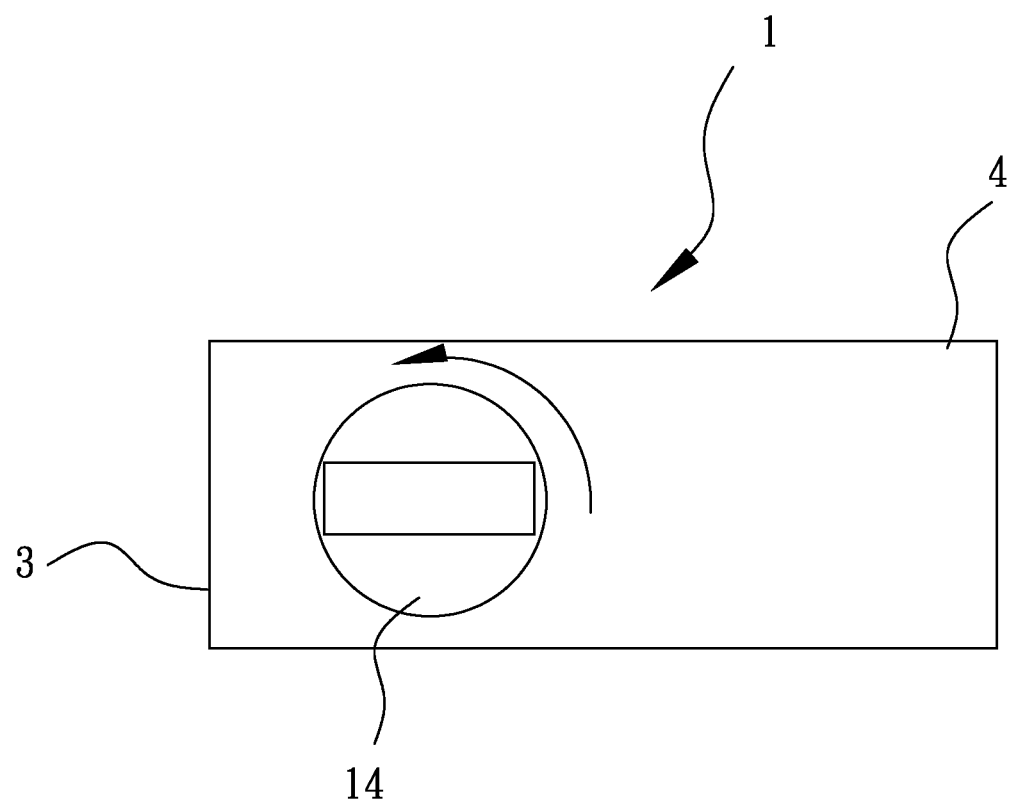
FIG. 3 is a bottom view of the integrated device for inhalation medication and peak flow measurement according to one embodiment of the present disclosure.
Figure 4:
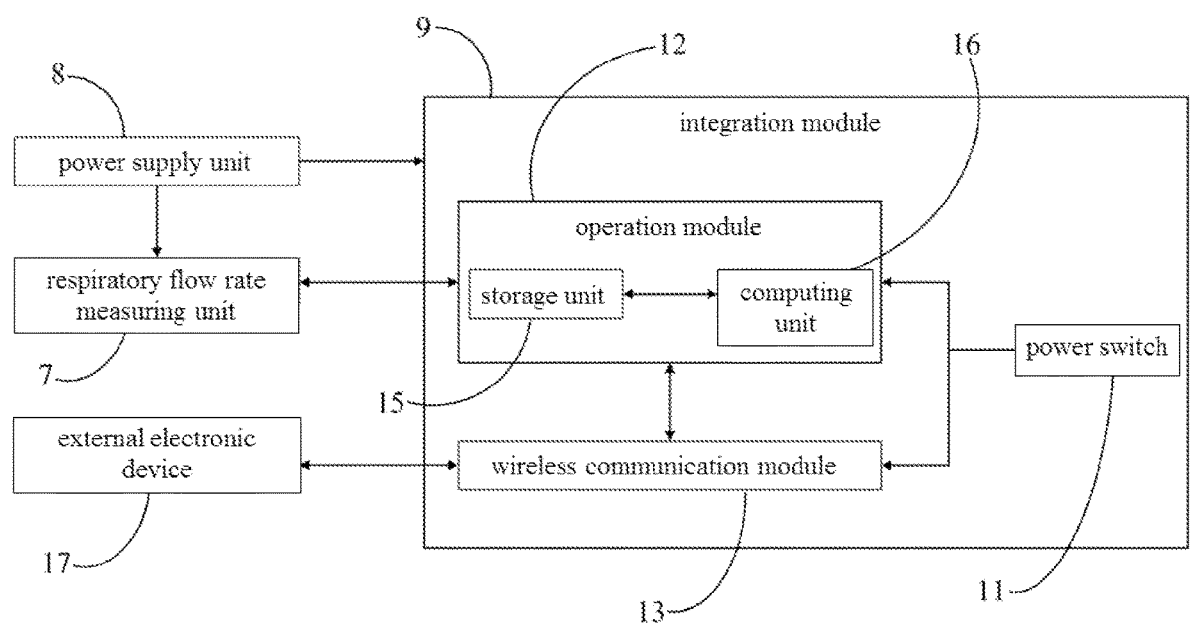
FIG. 4 a block diagram of an integration module, a respiratory flow rate measurement unit, and a power supply unit in integrated device for inhalation medication and peak flow measurement according to one embodiment of the present disclosure.

Please refer to FIGS. 1 to 4, which are respectively a side and cross-sectional view and a schematic diagram of a power supply unit being disposed at a corner of an L-shaped inhaler body of an integrated device for inhalation medication and peak flow measurement, a schematic diagram of the power supply unit being disposed on both sides of the L-shaped inhaler body in the integrated device for inhalation medication and peak flow measurement, a bottom view of the integrated device for inhalation medication and peak flow measurement, and a block diagram of an integration module, a respiratory flow rate measurement unit, and a power supply unit in integrated device for inhalation medication and peak flow measurement.

The integrated device for inhalation medication and peak flow measurement 1 comprises a medicine bottle 2, an L-shaped inhaler body 3, a drug release port 4, a medicine bottle bracket 5, an L-shaped drug delivery channel 6, a respiratory flow rate measurement unit 7, a power supply unit 8, an integration module 9, a plurality of air holes 10, and a medicine bottle bracket knob 14.

The medicine bottle 2 is disposed on the L-shaped inhaler body 3, and the drug release port 4 is located at the other side of the medicine bottle 2 disposed on the L-shaped inhaler body3. The medicine bottle bracket 5 is disposed below an inner portion of the L-shaped inhaler body 3, and the L-shaped drug delivery channel 6 is disposed at an inner side of the medicine bottle bracket 5, while the respiratory flow rate measuring unit 7 is disposed at an outer side of the medicine bottle bracket 5. One end of the L-shaped drug delivery channel 6 is connected to an opening of the medicine bottle 2, and the other end is facing the drug release port 4. The respiratory flow rate measuring unit 7 is disposed on the opposite side of the L-shaped drug delivery channel 6 towards an end of the drug release port 4.

The power supply unit 8 is disposed at a corner and/or both sides of the L-shaped inhaler body 3. The air holes 10 are disposed at a lower corner of the L-shaped inhaler body 3. The integration module 9 is disposed below the L-shaped inhaler body 3 and between the drug release port 4 and the medicine bottle bracket 5. The integration module 9 comprises a power switch 11, an operation module 12, and a wireless communication module 13. The power supply unit 8 is respectively electrically connected to the respiratory flow rate measurement unit 7, the power switch 11, the operation module 12, and the wireless communication module 13, while the medicine bottle bracket knob 14 is integrally disposed below the medicine bottle bracket 5.

Preferably, the power supply unit 8 may be a disposable battery, a rechargeable battery, or a solar power supply module. When the power supply unit 8 is a disposable battery, the L-shaped inhaler body 3 is provided with a cover (not shown in the figure) corresponding to an outside of the power supply unit 8 to replace the battery. When the power supply unit 8 is a rechargeable battery, the L-shaped inhaler body 3 is provided with a charging base (not shown in the figure) corresponding to the outside of the power supply unit 8, so that the external power switch can be provided to charge the rechargeable battery. In addition, when the power supply unit 8 is a solar power supply module, the L-shaped inhaler body 3 is equipped with solar panels corresponding to the outside of the power supply unit 8 (that is, the corners and/or both sides of the L-shaped inhaler body 3), so that the solar power supply module can absorb light energy to the outside, and then convert it into electrical energy for use by the integrated device for inhalation medication and peak flow measurement 1.

When patients with chronic respiratory diseases must use the integrated device for inhalation medication and peak flow measurement 1 for inhalation drug administration, the method is as follows: after containing the drug release port 4, press the medicine bottle 2 to release the drug along the opening of the medicine bottle 2 to the L-shaped drug delivery channel 6. After the patient inhales the drug, the drug administration is completed once. The external air is sucked into the L-shaped inhaler body 3 through the air holes 10 to avoid the closed state formed inside the L-shaped inhaler body 3, which affects the patient's inhalation of drugs. At this time, the operation module 12 immediately records and analyzes the medication action to analyze and record whether the medication action is effective.

If it is necessary to measure the peak flow rate of respiration, the method is as follows: before or after the drug administration, pull the bottle bracket knob 14, rotate the medicine bottle bracket 5 by 180 degrees, and make the respiratory flow rate measurement unit 7 face the drug release port 4. Then, the patient takes a deep breath and exhales with the drug release port 4, while the air holes 10 can exhale correspondingly to discharge the air inside the L-shaped inhaler body 3, avoiding the formation of high pressure or closed state inside the L-shaped inhaler body 3, which affects the peak flow rate of the patient's breath measurement. The flow rate, temperature, and/or flow rate of the airflow when the patient exhales is measured by respiratory flow rate measuring unit 7, and the operation module 12 records and analyzes the flow rate, temperature, and/or flow rate of the airflow in real-time, so as to know the peak flow rate of the current respiration and related information.

Preferably, the respiratory flow rate measuring unit 7 may be a chip, sensor, sensing element, and other respiratory flow rate measuring units, but it is not limited thereto.

The operation module 12 comprises a storage unit 15 and a computing unit 16. The storage unit 15 is used to store the patient's medication time, medication times, medication dosage, and other medication data, or to store respiratory data such as flow rate, temperature, and/or flow rate of airflow when the patient exhales. The computing unit 16 is used for computing the drug administration data or the respiratory data to obtain corresponding drug administration information or respiratory information, and then stores the information to the storage unit 15.

Preferably, the computing unit 16 is a processor containing multiple cores to improve the conversion speed of drug administration data or respiratory data into corresponding drug administration information or respiratory information.

Preferably, the storage unit 15 is a memory, and the memory may comprise a read-only memory or a flash memory.

The wireless communication module 13 can transmit the drug administration information and respiratory information stored in the storage unit 15 to an external electronic device 17, so that patients or doctors can view them and understand the current medication demand or medication effect.

Preferably, the wireless communication module 13 may be Bluetooth, wireless fidelity (Wi-Fi), near field communication (NFC), and other wireless communication modules, but it is not limited thereto.

Preferably, the external electronic device 17 can be an external electronic device 17 such as a desktop computer, a notebook computer, a smart phone, and a cloud server, but it is not limited thereto.

To sum up, the integrated device for inhalation medication and peak flow measurement of the present disclosure is capable of enabling the inhaler device to have both medication function and respiratory flow rate measurement function by integrating the respiratory flow rate measurement unit and the wireless communication module into the inhaler device and transmitting the measured respiratory flow rate data and medication data to the external electronic devices through the wireless communication module, which can be easily viewed by patients or doctors. Furthermore, it is also possible to build a personalized health assessment model based on these medication data and respiratory data as a reference for medical personnel to make treatment decisions, improve the convenience of patients' use, help patients' medication compliance, and reduce the possibility of disease deterioration.

Those in the technical field to which the present disclosure belongs can understand from the foregoing that the present disclosure may not change the technical concept or essential features of the disclosure by other specific forms and examples. In this regard, the illustrative properties disclosed herein are only for illustrative purposes and should not be interpreted as limiting the scope of the disclosure. On the contrary, the disclosed content tends to cover not only those exemplary properties, but also a variety of changes, modifications, equivalents, and other aspects that can be included in the spirit and scope of the content of the present disclosure as defined in the scope of patent application attached below.

What is claimed is:

1. An integrated device for inhalation medication and peak flow measurement, comprising:
a medicine bottle, an L-shaped inhaler body, a drug release port, a medicine bottle bracket, an L-shaped drug delivery channel, a respiratory flow rate measurement unit, a power supply unit, an integration module, a plurality of air holes, and a medicine bottle bracket knob;

wherein, the medicine bottle is disposed on the L-shaped inhaler body, and the drug release port is disposed at the other side of the medicine bottle disposed on the L-shaped inhaler body;

the medicine bottle bracket is disposed below an inner portion of the L-shaped inhaler body, and the L-shaped drug delivery channel is disposed at an inner side of the medicine bottle bracket, while the respiratory flow rate measurement unit is disposed at an outer side of the medicine bottle bracket, one end of the L-shaped drug delivery channel is connected to an opening of the medicine bottle, and the other end is facing the drug release port;

the respiratory flow rate measurement unit is disposed on the opposite side of the L-shaped drug delivery channel from the end that faces the drug release port;

the power supply unit is disposed at a corner of the L-shaped inhaler body and/or at one side of the L-shaped inhaler body adjacent to the drug release port;

the plurality of air holes are disposed at a lower corner of the L-shaped inhaler body;

the integration module is disposed below the L-shaped inhaler body and between the drug release port and the medicine bottle bracket; and the medicine bottle bracket knob is integrally disposed below the medicine bottle bracket, wherein the respiratory flow rate measuring unit comprises a chip, a sensor or a sensing element;

wherein the power supply unit comprises a disposable battery, a rechargeable battery, or a solar power supply module;

wherein the integration module comprises a power switch, an operation module, and a wireless communication module, the operation module comprises a storage unit and a computing unit, and the wireless communication module is a short-range wireless communication module; and wherein the storage unit comprises a read-only memory and/or flash memory, and the computing unit is a multi-core processor.

2. The integrated device for inhalation medication and peak flow measurement as claimed in claim 1, wherein power supply unit is respectively and electrically connected to the respiratory flow rate measurement unit, the power switch, the operation module, and the wireless communication module.

3. The integrated device for inhalation medication and peak flow measurement as claimed in claim 2, wherein the storage unit is used to store a medication data, a respiratory data, and a drug administration information, and a respiratory information corresponding to a patient, and the computing unit is configured to be used to calculate the medication data and the respiratory data, thereby getting the corresponding drug administration information and respiratory information.

4. A method of drug administration comprises a step of providing a user with the integrated device for inhalation medication and peak flow measurement as claimed in claim 1, the step comprising:

pressing the medicine bottle to release a drug along the opening of the medicine bottle to the L-shaped drug delivery channel after holding the drug release port on the integrated device for inhalation medication and peak flow measurement by a patient, wherein after the patient inhales the drug, the integrated device completes a drug administration action; and immediately recording the drug administration action and conducting analysis to analyze and record whether the drug administration action is effective by the operation module on the integrated device for inhalation medication and peak flow measurement when completing the drug administration action.

5. The method of drug administration and as claimed in claim 4, wherein the operation module on the integrated device for inhalation medication and peak flow measurement records the drug administration action immediately and analyzes it to obtain a drug administration information; and the drug administration information is transmitted to an external electronic device through the wireless communication module on the integrated device for inhalation medication and peak flow measurement for viewing by the patient or physician.

6. A method for measuring a respiratory state comprises a step of providing a user with the integrated device for inhalation medication and peak flow measurement as claimed in claim 1, the step comprising:

pulling the medicine bottle bracket knob on the integrated device for inhalation medication and peak flow measurement, rotating the medicine bottle bracket 180 degrees, and making the respiratory flow rate measurement unit face the drug release port before or after drug administration;

holding the drug release port on the integrated device for inhalation medication and peak flow measurement to exhale by a patient after taking a deep breath; and measuring the flow rate and/or temperature of the airflow by the respiratory flow rate measurement unit on the integrated device for inhalation medication and peak flow measurement when exhaling by the patient;

instantly recording and analyzing the flow rate and/or temperature data of the airflow by the operation module on the integrated device for inhalation medication and peak flow measurement to know the peak flow rate of the current respiration and related information.

7. The method for measuring a respiratory state as claimed in claim 6, wherein the operation module on the integrated device for inhalation medication and peak flow measurement instantly records the flow rate and/or temperature data of the airflow and analyzes them to obtain a respiratory information; and the respiratory information is transmitted to an external electronic device through the wireless communication module on the integrated device for inhalation medication and peak flow measurement for viewing by patients or physicians.

\* \* \* \* \*